United States Patent
Munoz et al.

(10) Patent No.: US 11,526,337 B2
(45) Date of Patent: Dec. 13, 2022

(54) SYSTEMS AND METHODS FOR CONSISTENT FEATURE FLAG EVALUATION

(71) Applicants: Atlassian Pty Ltd., Sydney (AU); Atlassian Inc., San Francisco, CA (US)

(72) Inventors: Francisco Javier Cano Munoz, Sydney (AU); Jimmy Li, Sydney (AU); Houda Chehab, Sydney (AU); Rob Sangster, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/186,300

(22) Filed: Feb. 26, 2021

(65) Prior Publication Data
US 2022/0276845 A1 Sep. 1, 2022

(51) Int. Cl.
- *G06F 8/41* (2018.01)
- *G06F 9/30* (2018.01)
- *G06F 8/71* (2018.01)

(52) U.S. Cl.
CPC .................. *G06F 8/43* (2013.01); *G06F 8/71* (2013.01); *G06F 9/30094* (2013.01)

(58) Field of Classification Search
CPC ........... G06F 9/30094; G06F 8/71; G06F 8/43
See application file for complete search history.

(56) References Cited

U.S. PATENT DOCUMENTS

| | | | | |
|---|---|---|---|---|
| 9,753,750 B2* | 9/2017 | Shani | .................. | G06F 8/60 |
| 10,262,155 B1* | 4/2019 | Sun | .................. | G06F 21/629 |
| 10,776,180 B1* | 9/2020 | Ma | .................. | G06F 16/907 |
| 10,824,548 B1* | 11/2020 | Kapusta | .............. | G06F 11/3688 |
| 11,106,754 B1* | 8/2021 | Bailey | ................. | G06F 21/6218 |
| 11,188,313 B1* | 11/2021 | Huffman | ............. | G06F 11/3604 |
| 2012/0246449 A1* | 9/2012 | Assarpour | ............... | G06F 9/327 712/216 |
| 2015/0281387 A1* | 10/2015 | Barreto | ................... | H04L 67/18 709/203 |
| 2016/0063282 A1* | 3/2016 | Shani | ..................... | G06F 21/71 717/121 |
| 2017/0168919 A1* | 6/2017 | Eberlein | ............. | G06F 11/3664 |
| 2018/0322032 A1* | 11/2018 | Thazhathekalam | ......................... | G06F 9/44505 |

(Continued)

OTHER PUBLICATIONS

Schermann et al., "An empirical study on principles and practices of continuous delivery and deployment" (Year: 2016).*

(Continued)

*Primary Examiner* — Phillip H Nguyen (74) *Attorney, Agent, or Firm* — Brownstein Hyatt Farber Schreck, LLP (57) ABSTRACT

Described herein is a computer implemented method. The method comprises executing an application defining a feature flag, the execution of the application being associated with a user identifier. The method further comprises determining if version data associated with the feature flag and user identifier is stored in a local data store. In response determining that the version data associated with the feature flag and user identifier is stored in the local data store an evaluation request is generated that includes the version data and the user identifier. The evaluation request is then communicated to a feature flag evaluation service.

20 Claims, 4 Drawing Sheets

(56) References Cited

U.S. PATENT DOCUMENTS

| | | | |
|---|---|---|---|
| 2020/0104773 A1* | 4/2020 | Pechacek | G06Q 10/101 |
| 2020/0128089 A1* | 4/2020 | Rizvi | H04L 67/141 |
| 2020/0293943 A1* | 9/2020 | Vadella | G06N 5/047 |
| 2021/0192401 A1* | 6/2021 | Chandrasekaran | G06Q 10/103 |

OTHER PUBLICATIONS

Pete Hodgson, "Feature Toggles (aka Feature Flags)" (Year: 2017).*
Rahman et al., "Feature Toggles: Practitioner Practices and a Case Study" (Year: 2016).*

* cited by examiner

SYSTEMS AND METHODS FOR CONSISTENT FEATURE FLAG EVALUATION

TECHNICAL FIELD

The present disclosure is directed to systems and methods for consistent feature flag evaluation.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Feature flags (also referred to, for example, as feature toggles, feature switches, conditional features) are a mechanism by which features that have been deployed in a software product (e.g. an application) can be enabled or disabled. Generally speaking, a feature flag provides a conditional logic wrapper around a feature. When the software product is launched by an end user the conditional logic is evaluated. If the evaluation result is true the feature is enabled/made available in the software product. Otherwise it is not.

Feature flags, therefore, provide software developers the ability to control whether features included in a deployed/released code base are available or unavailable to end users.

While the disclosed embodiments are amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the appended claims.

DETAILED DESCRIPTION

In the following description, for the purposes of explanation, numerous specific details are set forth in order to provide a thorough understanding of the present disclosure. It will be apparent, however, that features of the present disclosure may be practiced without these specific details. In some instances, well-known structures and devices are shown in block diagram form in order to avoid unnecessary obscuring.

As described above, feature flags provide a mechanism which can be used to deploy software features but selectively enable/disable those features for end users.

The use of feature flags can provide a number of advantages. For example, feature flags allow software developers granular control over how a given feature is actually made available to end users. Using a feature flag, delivery of a feature may be controlled, for example, to specific users, users in a specific user tier, users in a particular geographic region, users with a particular product configuration, a set number/percentage of random users. This allows for software testing and user acceptance testing by a selected group or segment of users before the feature is rolled out to a wider user base. As another example, where availability of a feature is controlled by a feature flag, the feature can easily be rolled back (made unavailable) in the event that user feedback is sufficiently negative or an issue with the feature is identified.

Various software products/systems have been developed to assist with using feature flags—for example LaunchDarkly, optimizely, CloudBees. For ease of reference, products/systems such as these will be referred to as feature flag systems. In LaunchDarkly, for example, roll out of a feature is controlled by customizable target rules (i.e. a feature flag rule set) which dictate when, and to what users/user groups, features behind feature flags are made available.

When a front end client executes software/instructions in respect of a feature flag the instructions cause the client to request evaluation of the feature flag (typically from a remote system) to determine whether the evaluation result is true (in which case the associated feature is enabled at the front end client) or false (in which case it is not). This evaluation is based on the rule set for the feature flag and contextual data.

The specific rules that can be included in the rule set for a feature flag are not of direct relevance to the present disclosure. By way of example, however, feature flag rules may relate to thresholds or values for parameters such as: a locale that a user is using an application/product; the size of a team the user belongs to; how many hours/days a user has been using an application/product for; whether the user has access to other applications/products (e.g. applications provided by the same company as the application being used); whether the user is part of an early access (or other type of) group. Many other types of rules can be implemented.

Contextual data refers to data other than rules that is required in order to evaluate a feature flag. As with feature flag rules, the specific types of contextual data that can be used in evaluating a feature flag are not of direct relevance to the present disclosure. By way of example, however, contextual data may be values that allow the examples rules provided above to be evaluated—for example: a user's location; the team or teams a user belongs to; the number of hours a user has used the application/product in question; what applications the user is known to have access to; etc.

An issue that can arise where feature flags are used is what will be referred to as feature flag flickering.

As used herein, feature flag flickering occurs where a given feature is behind a feature flag which, for a given client and over a given period of time, should have a consistent evaluation (e.g. true or false) because over the given time period neither the feature flag rules nor relevant contextual data changes. Despite the constant feature flag rules and relevant contextual data, however, successive evaluations of the feature flag may nonetheless yield inconsistent evaluation results (i.e. at one time being evaluated as true and another as false), causing the feature that is behind the feature flag to switch (or flicker) between being enabled and not being enabled.

Feature flag flickering such as this is undesirable for various reasons. From the client perspective flickering causes an inconsistent and frustrating user experience: a feature is enabled/available, then it is not, then it is, then it is not and so forth. From the software developer perspective, flickering makes true evaluation of a feature that has been released behind a feature flag difficult as it can compromise data around the number of (and which specific) users a feature has been enabled for or not.

Feature flag flickering can, for example, arise in computing environments where multiple feature flag services operate concurrently in order to handle client request load. In this case, a feature flag service receives, processes, and responds to evaluation requests based on feature flag rules and contextual data that are available to the feature flag service. In an environment such as this the multiple feature flag services (or, at least, their data stores) will typically operate on an eventual consistency basis: i.e. over time the feature flag data maintained by each feature flag service will reach a consistent state, but at any given time the data of one feature flag service may differ to that of another. This temporal difference may be due to various factors, for example network latency, system failures, hardware capabilities, and other reasons.

In such an environment, therefore, consider the example where a given user: connects, at a first time, to one feature flag service which (based on that feature flag service's data) evaluates a particular feature flag as true; then, at a second time, connects to a different feature flag service which evaluates (based on that feature flag service's data) the same feature flag as false. In this case the feature behind the feature flag will be enabled for the user at the first time but not the second time—even though neither the feature flag rules nor the relevant contextual data have changed.

The present disclosure is directed to systems and computer implemented methods for consistently evaluating feature flags and, therefore, avoiding (or at least reducing) 'flickering' such as this.

Figure 1:
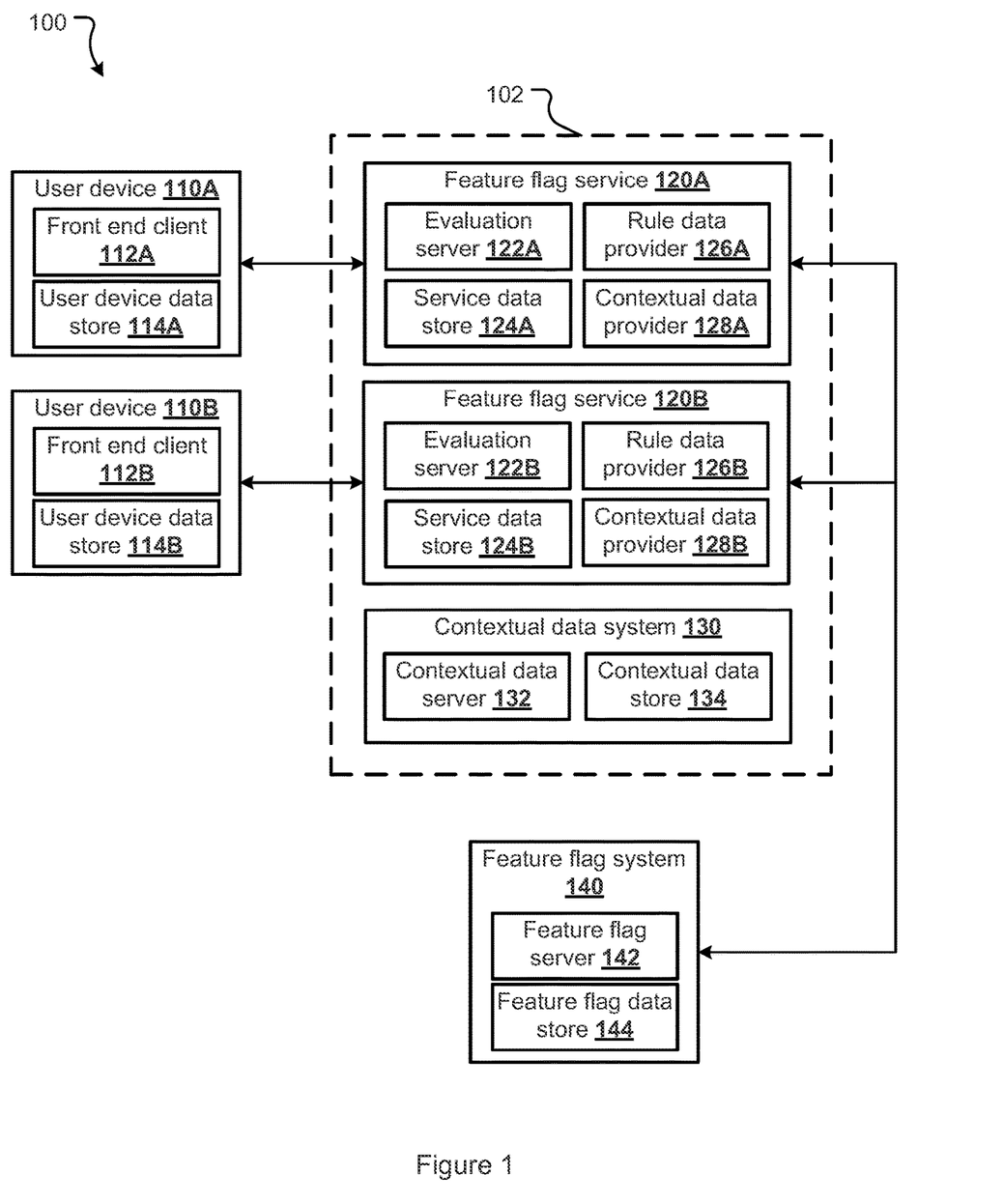
FIG. 1 depicts an example environment in which the features described herein can be implemented.

Turning to FIG. 1, an example environment 100 in which the features described herein can be implemented will be described.

In this example, environment 100 includes user devices 110, feature flag services 120, a contextual data system 130, and a feature flag rule system 140.

Two user devices 110A and 110B and two feature flag services 120A and 120B are illustrated however the features and techniques described herein can be applied to an environment with any number of user devices 110 and feature flag services 120. Unless the specific user device is of relevance reference will be made to user device 110 (rather than 110A or 110B). Similarly, unless the specific feature flag service is of relevance reference will be made to feature flag service 120 (rather than 120A or 120B).

A user device 110 includes a front end client 112 and a user device data store 114.

Front end client 112 may be any application that makes use of one or more feature flags to selectively enable or disable a feature. Accordingly, front end client 112 may be a web browser or a native application that runs on user device 110.

User device data store 114 is a local data store maintained by the user device 110.

In the present disclosure, the front end client 112 causes the user device 110 to communicate with a feature flag service 120 (and, in particular, an evaluation server 122 thereof). Such communications are via one or more networks (such as network 220 of FIG. 2 and/or an alternative network). Communication between a user device 110 and feature flag service 120 will typically be via a load balancer or the like (not shown) which initially receives requests and directs them to a particular feature flag service 120. In the example of FIG. 1, user device 110A has connected to feature flag service 120A and user device 110B has connected to feature flag service 120B. Over time this may well change, however. For example, at one time user device 110A may connect to feature flag service 120A and at a subsequent time user device 110A may connect to feature flag service 120B.

In the present example, the feature flag service 120 (120A and 120B) and contextual data system 130 are controlled by a single organization (indicated by broken line 102). While not shown, organization 102 will typically provide additional applications/systems—for example server systems which provide (or contribute to providing) the actual functionality of front end clients 110, a load balancer, applications to control the commissioning/decommissioning of feature flag services, and/or other applications/systems.

In this example, feature flag services 120 are commissioned and decommissioned based on user demand. For example, in periods of high user demand the organization 102 may commission additional feature flag service and in periods of low user demand organization 102 may decommission feature flag services 120 so fewer are running. A scalable system such as makes use of additional applications/service that are not shown. For example, a load balancer will typically be used to direct requests from a particular front end client (e.g. 112A) to a particular feature flag service (e.g. 120A).

In the present example, a feature flag service 120 includes an evaluation server 122, a feature flag service data store 124, a rule data provider 126, and a contextual data provider 128.

The evaluation server 122 is an application that receives evaluation requests from front end clients 112, processes those requests to generate evaluation responses, and communicates the evaluation responses back to the front end clients 112.

As described in further detail below, to process an evaluation request the evaluation server 122 access evaluation data which is stored in the service data store 124. The service data store 124 may make use of any appropriate data storage software and hardware. By way of example, service data store 124B may be a Redis data store which runs in memory accessible to the feature flag service 120.

The feature flag service data store 124 (referred to as service data store 124 for short) stores feature flag rule data which is obtained/received from feature flag system 140. In the present implementation, the feature flag rule data maintained at the service data store 124 includes, for each feature flag identifier: a current rule set (i.e. the actual rules that are currently set for the feature flag or a link/pointer thereto); and a rule set version identifier (which indicates a version identifier for the current rule set, discussed further below).

The feature flag rule data may be stored at the service data store 124 in any appropriate format. As one example, rule data may be stored in a table such as the following:

| Feature flag identifier | Current rule set | Rule set version identifier |
| --- | --- | --- |
| 0001 | [...] | 12 |
| 0002 | [...] | 3 |
| 0003 | [...] | 1 |
| ... | ... | ... |

The feature flag service's rule data provider 126 operates to update the feature flag rule data stored in the service data store 124. To do so, the rule data provider 126 is in communication with the feature flag system 140 (in particular the feature flag server 142) via one or more communication networks (such as network 220 of FIG. 2 and/or an alternative network). The rule data provider 126 may be configured to keep the rule data up to date in various ways. For example, in the present embodiments the rule data provider 126 subscribes to a rule data publication/subscription service to listen for any relevant rule data changes that are published by the feature flag server 142. When a relevant rule data change is published, the rule data provider 126 obtains the updated rule data (from the publication itself or via a request to the feature flag server 142 triggered by the publication) and stores the updated rule data in the service data store 124.

Figure 2:
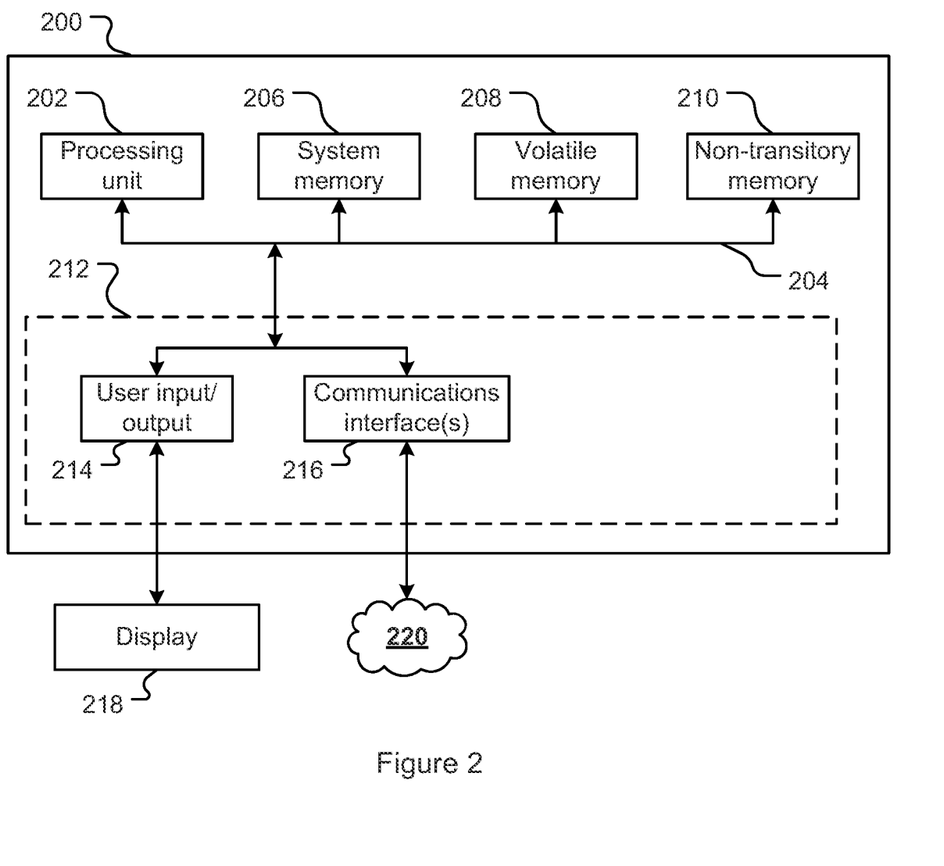
FIG. 2 is a block diagram of a computing system.

The feature flag service's contextual data provider 128 operates to retrieve contextual data from the contextual data system 130 (in particular the contextual data server 132) via one or more communication networks (such as network 220 of FIG. 2 and/or an alternative network). As discussed further below, when the evaluation server 122 receives a feature flag evaluation request it determines the feature flag rules relevant to the request (as stored in the service data store 124) and from these rules determines the contextual data required to evaluate the feature flag. The contextual date provider 128 is then invoked to retrieve the relevant contextual data from the contextual data system 130 (e.g. via an API request thereto).

In the present examples, a contextual data request generated by the contextual data provider 128 includes a user identifier (identifying the user the feature flag is being evaluated for) and identifiers of the particular contextual data required. In response to requesting contextual data, the rule data provider 126 receives a contextual data response which, in this example (and unless an error occurs), includes the user identifier, the contextual data that has been requested, and a contextual data version identifier (which, as discussed below, indicates a version identifier for the user's contextual data). As one example, contextual data may be received in a message such as {userId:<user identifier>, versionId:<contextual data version identifier>, data:[<requested contextual data>]}.

While the evaluation server 122, rule data provider 126, and contextual data provider 128 have been described as separate components of the feature flag service 120 this need not be the case. For example, evaluation server 122 could be configured to also perform the operations of the rule data provider 126 and/or contextual data provider 128 if desired.

The contextual data system 130 stores contextual data that is (or may be) relevant to the evaluation of feature flags. To this end contextual data system 130 includes a contextual data server 132 (which receives and responds to requests for contextual data, for example from contextual data providers 128) and a contextual data store 134 (in which the contextual data is actually stored).

The contextual data system 130 may itself receive and store contextual data from various other systems and services. In the present examples, contextual data system 130 associates contextual data with user identifiers. The contextual data system 130 may store contextual data in any appropriate manner. As one example, the contextual data may be stored in tables of a relational database. As noted above, the specific contextual data that is or can be associated with a user is not directly relevant to the present disclosure.

In addition, and relevantly to the present disclosure, each time the contextual data that is associated with a given user identifier changes, the contextual data server 132 is configured to generate a new contextual data version identifier and associate it with the given user identifier. The contextual data server 132 generates contextual data version identifiers so they are ordered for each user identifier. When two different contextual data version identifiers that are associated with a given user identifier are compared, the ordering allows one contextual data version identifier to be determined to be an earlier-in-time contextual data version identifier and the other a later-in-time contextual data version identifier.

By way of example, for a particular user identifier: the first contextual data version identifier generated may be 1; the second contextual data version identifier generated (when there is a change to the contextual data associated with the given user identifier) may be 2; the third 3; the fifteenth 15; and so forth. In this example monotonically increasing integers are used as contextual data version identifiers, however any other appropriate mechanism may be used to create contextual data version identifiers Feature flag system 140 is a system that allows users (e.g. software developers) to create and use feature flags. Generally speaking, feature flag system 140 allows software developers to create a feature flag by defining rules (stored in feature flag data store 144) and that are used in conjunction with contextual data to determine whether the feature managed by the feature flag should be enabled or disabled.

In the present examples, feature flag system 140 assigns a feature flag identifier to each feature flag that is created and associates rule data therewith. As noted above, the specific rules that can be defined (and, accordingly, rule data that is or can be associated with a feature flag identifier) are not directly relevant to the present disclosure.

In addition, and relevantly to the present disclosure, each time the rules associated with a given feature flag identifier change, the feature flag server 142 is configured to generate a new rule set version identifier and associate it with the given feature flag identifier. The feature flag server 142 generates rule set version identifiers so they are ordered for each feature flag identifier. When two different rule set version identifiers that are associated with a given feature flag identifier are compared, the ordering allows one rule set version identifier to be determined to be an earlier-in-time rule set version identifier and the other a later-in-time rule set version identifier.

By way of example, for a particular feature flag identifier: the first rule set version identifier generated may be 1; the second rule set version identifier generated (when there is a change to the rule set for the given feature flag identifier) may be 2; the third 3; the fifteenth 15; and so forth. In this example monotonically increasing integers are used as rule set version identifiers, however any other appropriate mechanism may be used to create rule set version identifiers The various systems and services of environment 100 are provided by computer processing systems. For example, each user device 110 is a computer processing system such as, for example, a desktop or laptop computer, a tablet, a smart phone, or an alternative computer processing system. Each feature flag service 120 will also be provided by one or more computer processing systems such as, for example, server systems. For example, the evaluation server 122, service data store 124, rule data provider 126 and contextual data provider 128 may each run on a separate server system, or may all run on a single server system. Similarly, the contextual data system 130 and feature flag system 140 will each be provided by one or multiple computer processing systems.

Turning to FIG. 2, a block diagram of an example computer processing system 200 (system 200 for short) is provided. System 200 is configurable to perform various functions described herein.

System 200 depicts a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the precise hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to system 200.

Through a communications bus 204, the processing unit 202 is in data communication with a one or more machine readable storage (memory) devices which store instructions and/or data for controlling operation of system 200. In this example system 200 includes a system memory 206 (e.g. a BIOS), volatile memory 208 (e.g. random access memory such as one or more RAM modules), and non-transitory memory 210 (e.g. one or more hard disk or solid state drives).

System 200 also includes one or more interfaces, indicated generally by 212, via which system 200 interfaces with various devices and/or networks. Other devices may be integral with or separate to system 200. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: Universal Serial Bus (USB); eSATA; Thunderbolt; Ethernet; HDMI. Other wired connections are possible.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM); Enhanced Data GSM Environment (EDGE); long term evolution (LTE); wideband code division multiple access (W-CDMA); code division multiple access (CDMA). Other wireless connections are possible.

Depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include display devices, speakers, and/or other output devices. System 200 may include or connect to devices which act as both input and output devices, for example memory devices (hard drives, solid state drives, disk drives, compact flash cards, SD cards and the like) which system 200 can read data from and/or write data to, and touch screen displays which can both display (output) data and receive touch signals (input).

Where the system 200 is user device such as 110, the system 200 includes or connects to a display 218 to output information. The display 218 may be a LCD, touch screen display, or other display.

System 200 also includes one or more communications interfaces 216 for communication with a network, such as network 220. Via the communications interface(s) 216 system 200 can communicate data to and receive data from networked devices, which may themselves be other computer processing systems.

System 200 stores or has access to computer applications (also referred to as software or programs)—i.e. computer readable instructions and data which, when executed by the processing unit 202, configure system 200 to receive, process, and output data. Such instructions and data can be stored on non-transitory machine readable medium accessible to system 200. For example, instructions and data may be stored on non-transitory memory 210. Instructions and data may be transmitted to/received by system 200 via a data signal in a transmission channel enabled (for example) by a wired or wireless network connection over a communications interface such as 216.

Applications accessible to system 200 will typically include an operating system application. System 200 also stores or has access to applications which, when executed by the processing unit 202, configure system 200 to perform various computer-implemented processing operations described herein. For example, and referring to the networked environment of FIG. 1: user device 110 includes a front end client application 112; each feature flag service 120 includes an evaluation server application 122, rule data provider 126, and contextual data provider 128; contextual data system 130 includes a contextual data server application 132; feature flag system 140 includes a feature flag server application 142.

Figure 3:
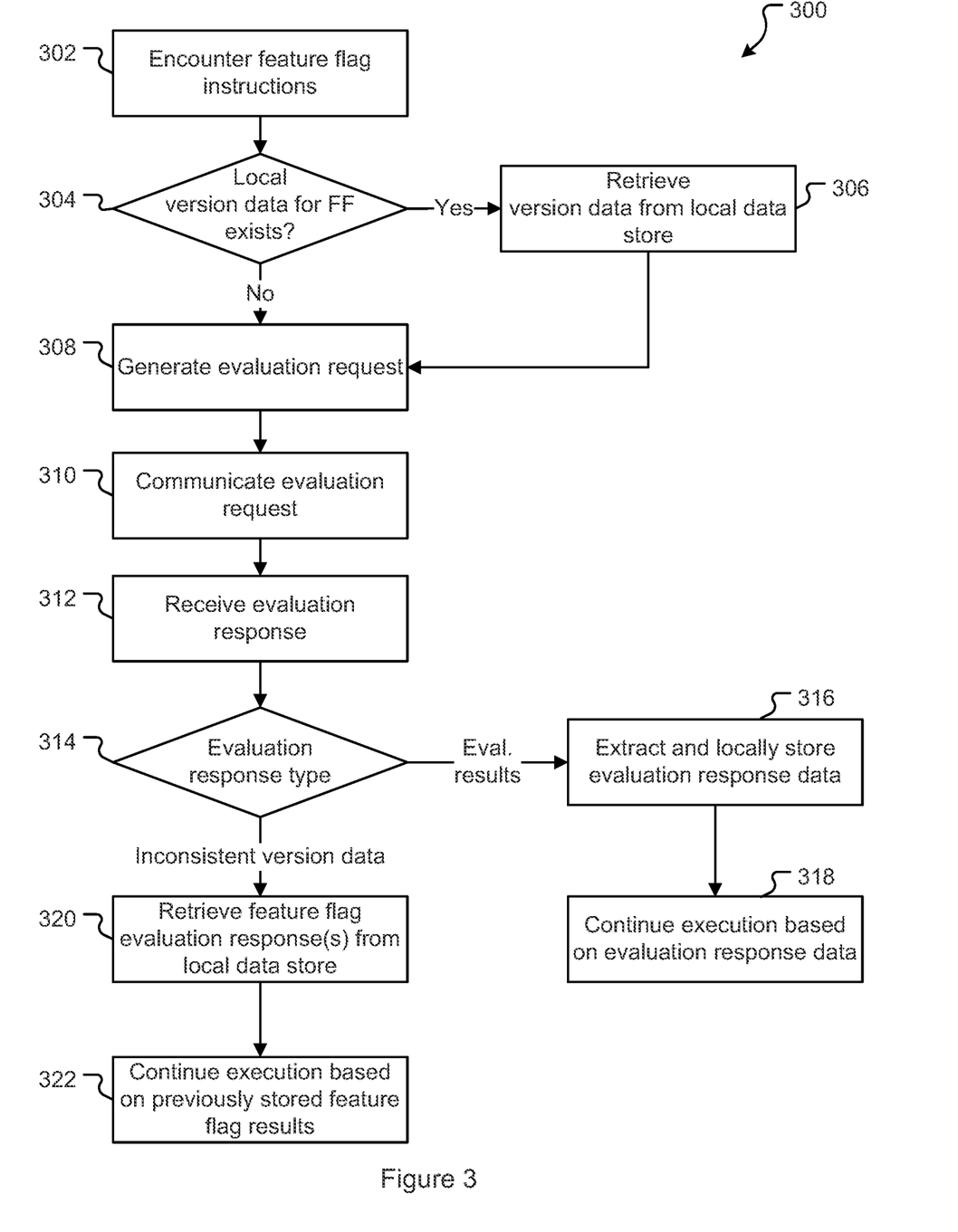
FIG. 3 is a flowchart depicting operations performed by a front end client on encountering a feature flag.

As described above, the front end client 112 (running on a user device 110) may be any application that makes use of one or more feature flags to selectively enable or disable a feature. To this end, when executed the front end client 112 will perform operations relating to at least one feature flag. Turning to FIG. 3, a flowchart 300 depicting operations involved when a front end client 112 executes code in respect of a feature flag will be described.

At 302, front end client 112 encounters feature flag instructions while executing—i.e. instructions in respect of one or more feature flags which must be evaluated in order to determine whether, for each feature flag, a feature associated with the feature flag should be enabled or disabled.

In the present embodiments, the feature flag instructions identify a set of one or more feature flags that are relevant to execution of the front end client 112. The set of feature flags is identified by a feature flag set identifier (also referred to as a set identifier for short). By way of example, the feature flag set identifier may be a key that can be used by the feature flag service 120 to directly identify a set of one or more features flags (each feature flag being identified by a feature flag identifier). In another example, the feature flag set identifier may identify a particular project which, in turn, is associated with the set of one or more feature flag(s).

At 304, front end client 112 determines whether version data in respect of the feature flag set identifier is locally stored at the user device 110 (e.g. in the user device data store 114). In the present example this is done by calculating a hash of the set identifier and user identifier (i.e. the user identifier of the user executing the front end client 112) and determining whether version data associated with that hash is stored at the user device data store 114. (The receipt and storage of version data is discussed further below with respect to operation 316.)

If, at 304, the set of feature flags has previously been processed (e.g. on a previous execution of front end client 112A), version data associated with the set identifier will be stored in the user device data store 114. In this case processing proceeds to 306 where the front end client 112 retrieves the version data associated with the set identifier from the user device data store 114. Processing then proceeds to 308.

Alternatively, if at 304 it is the first time the particular set identifier has been encountered, version data associated with the set identifier will not be stored in the user device data store 114, in which case processing proceeds directly to 308.

At 308, front end client 112 generates an evaluation request. The evaluation request includes the user identifier of the user who is running the front end client 112 (or data that allows the user identifier to be determined) and the feature flag set identifier.

If version data for the feature flag exists (and, therefore, was retrieved at 306), the evaluation request also includes the version data.

In the present embodiments the evaluation request is an API request. Any appropriate request format can be used. An example format of an evaluation request that includes client version data is as follows:

```
{
  featureFlagSetId: abcd,
  userId: 1234,
  version: {
    "flagVersions": {
      "flag.key.1":23,
      "flag.key.3":5
    },
    "entityVersion": {
      "user-1234":67
    }
  }
}
```

In this example, the evaluation request includes a feature flag set identifier, a userId, and version data.

The featureFlagSetId field is populated with the identifier of the set of feature flags. This is used by the evaluation server 122 to identify one or more specific feature flag(s) that is/are to be evaluated.

The userId field is populated with the identifier of the user running the front end client 112.

If version data was retrieved at 306 the version field is populated with that data. In this example, the version data includes feature flag rule set version data and contextual data version data.

The feature flag rule set version data includes rule set version identifiers for each feature flag of relevance. In this case the rule set version data is provided by a "flagVersions" object which provides a key value pair for each feature flag in question: the key of each pair identifies a particular feature flag and the value is the rule set version identifier for that feature flag.

The contextual data version data includes a contextual data version identifier associated with the current user. In this case the contextual data version data is provided by an "entityVersion" object that associates the user identifier ("user-1234") with a contextual data version identifier (in this case 67).

The version data can include additional information, for example segment version data if this is relevant to the feature flag implementation. In this particular example, the version data is shown as a formatted JSON object. The version data can, however, be opaque to the client (in the sense that the client does not need to be able to access/interpret individual values from the version data). Accordingly, provided the version data can be interpreted by the feature flag service 120 when it is included in an evaluation request the version data can take any format (e.g. a single string with the relevant version data concatenated).

An example format of an evaluation request that does not include version data is as follows:

```
{
  featureFlagSetId: abcd,
  userId: 1234,
  version: null
}
```

In this example no version data is provided (as indicated by the null value). Where there is no version data alternative mechanisms for indicating this are possible, for example populating the version field with a particular/reserved value that indicates no version data is currently stored at the user device 110.

At 310, front end client 112 communicates the evaluation request to a feature flag service 120 (in particular to an evaluation server 122 thereof).

At 312, front end client 112 receives an evaluation response from the feature flag service 120 (in particular from the evaluation server 122 that the request was communicated to).

Generally speaking, the evaluation response will either be what will be referred to as an evaluation results response or an inconsistent version data response.

An evaluation results response will include evaluation response data that, in the present examples, includes: an evaluation result for each feature flag defined by the set identifier; and version data. Any appropriate format may be used for the evaluation response data, for example:

```
{
  flagValues: [
    { key: flag1,
      value: true
```

-continued

```
  },
  { key: flag2,
    value: false
  }
  { key: <feature flag identifier>,
    value: <evaluation result>
],
version: [
   "flagVersions": [
      "flag.key.1":23,
      "flag.key.3":5
   },
   "entityVersion": [
      "user-1234":67
      {
  }
}
```

In this example, the feature flag with identifier "flag1" has evaluated as true and the feature flag with identifier "flag2" has evaluated as false. The format of the version data (in the version field) is as described above.

An inconsistent version data response indicates that evaluation response data (e.g. feature flag evaluation results and version data) is not being returned. This may be indicated in any appropriate way, for example by either the absence of return data or the inclusion of specific message data. As one example, an inconsistent version data response may take the following format:

```
{
   Error,
   Message: Inconsistent version data
}
```

At 314, front end client 112 determines a type of the evaluation response. In the present example, and following the above, an evaluation response is either an evaluation results response or an inconsistent version data response.

If, at 314, front end client 112 determines the evaluation response is an evaluation results response processing proceeds to 316. At 316, front end client 112 extracts the evaluation response data from the evaluation response and stores this in local storage (e.g. in the user device data store 114). This involves storing the evaluation result for each feature flag (which is recorded as the current setting for the feature flag) and the version data (which is stored as the current version data). The evaluation result received in the evaluation response may be the same as or different to the locally stored evaluation result (if any). Similarly, the version data received in the evaluation response may be the same as or different to the locally stored version data (if any).

The evaluation result and version data are both associated with an evaluation response key. In the present example, the result key is a hash of the combination of the feature flag set identifier and userId. The evaluation response key and data may be stored in any appropriate data structure, for example a table as follows:

| Evaluation response key | Evaluation result | Version data |
|---|---|---|
| 35FE84CA | [. . .] | {. . .} |
| 42FE37CB | [. . .] | {. . .} |
| . . . | . . . | . . . |

Where the front end client 112 is a web browser application, the evaluation response data is stored in local storage in the browser. If the front end client 112 is a native application the evaluation response data is stored in memory managed by that application (or the platform/operating system in question).

Once the evaluation response data has been extracted and stored processing proceeds to 318. At 318, front end client 112 continues execution based on the evaluation result(s) for the feature flag(s) provided in the evaluation response (and now locally stored): e.g. if the returned evaluation result for a given feature flag is true that feature will be enabled, if not it will be disabled.

Returning to 314, if front end client 112 determines the evaluation response is an inconsistent version data response processing proceeds to 320. At 320, front end client 112 retrieves locally stored evaluation result(s) for the feature flag(s) in question from the user device data store 114. At 322, front end client 112 then continues execution based on the existing, previously stored evaluation result(s) of the feature flag(s): i.e. if the locally stored evaluation result for a feature flag is true the feature will be enabled, if not it will be disabled.

As described below, an inconsistent version data response occurs when the version data included in the evaluation request indicates that the front end client 112 has previously had the feature flag set evaluated with respect to either a more recent rule set and/or more recent contextual data than is available to the evaluation service 120 that receives the evaluation request.

Figure 4:
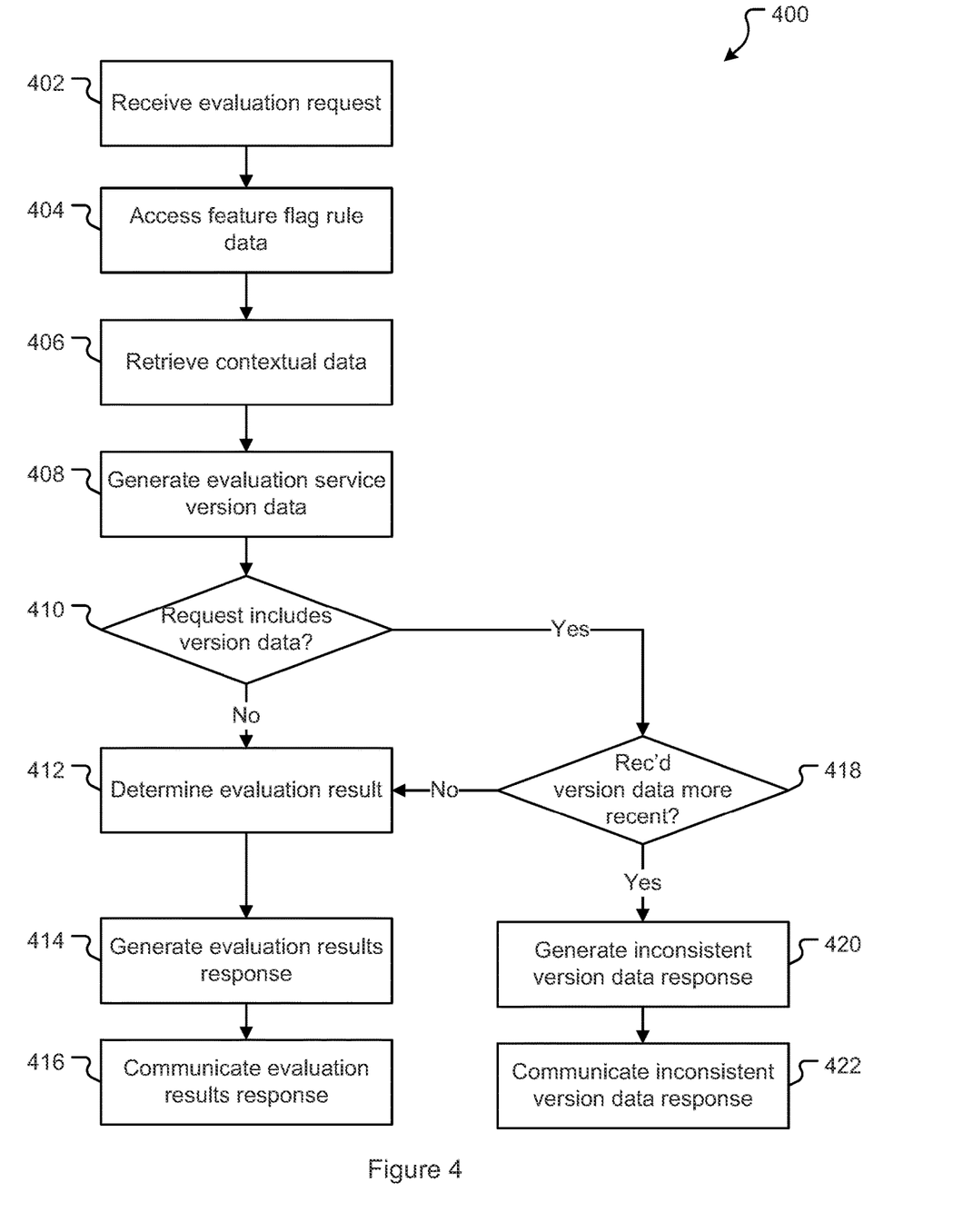
FIG. 4 is a flowchart depicting operations performed by a feature flag service on receiving a feature flag evaluation request from a front end client.

FIG. 4 provides a flowchart 400 depicting operations involved when a feature flag service 120 (in particular an evaluation server 122 thereof) receives an evaluation request from a front end client 112.

At 402, evaluation server 122 receives an evaluation request from a front end client 112 (for example a request as communicated at operation 310 described above). The evaluation request may, for example, take the form described above, including a feature flag set identifier, a user identifier, and version data.

At 404, evaluation server 122 accesses feature flag rule data from the service data store 124. In particular, for each feature flag identified in the request (e.g. by the feature flag set identifier), evaluation server 122 may access the rule set and the rule set version identifier.

At 406, evaluation server 122 retrieves contextual data from the contextual data system 130 (e.g. via the contextual data provider 128). In particular, evaluation server 122 may retrieve the contextual data associated with the user identifier included in the request as well as the current contextual data version identifier for the contextual data.

At 408, evaluation server 122 generates evaluation service version data. The evaluation service version data allows both a rule set version identifier(s) and a contextual data version identifier to be determined. In the present embodiments, and as discussed above, the evaluation service version data includes (or is based on) the feature flag identifier(s) and current rule set version identifiers thereof (as accessed at 404) as well as the user identifier and the current contextual data version identifier associated with the user identifier (as retrieved, for example, at 406). As discussed above, any appropriate format may be used for the evaluation service version data.

At 410, evaluation server 122 determines if the evaluation request includes request version data. In the context of the present example, if the version field of the request is null the evaluation server 122 determines that the evaluation request does not include request version data. Otherwise, the value of the version field is the request version data. If the evaluation request does not include request version data this indicates that it is the first time the front end client 112 has encountered the particular feature flag in question.

If, at 410, evaluation server 122 determines that the evaluation request does not include request version data processing proceeds to 412. At 412, evaluation server 122 determines the evaluation result(s) for the feature flag(s) identified in the evaluation request: i.e. for each feature flag identified by the set identifier a value of true (indicating the feature behind the feature flag should be enabled) or false (indicating it should not).

To determine the evaluation result for a particular feature flag, evaluation server 122 the rule set associated with the feature flag (e.g. as accessed at 404) and the contextual data relevant to those rules (e.g. as retrieved at 406).

At 414, evaluation server 122 generates an evaluation results response. The evaluation results response includes the evaluation result (determined at 412) and the evaluation service version data (as generated at 408). One example format of the evaluation results response is described above.

At 416, the evaluation results response is communicated to the front end client 112.

Returning to 410, if evaluation server 122 determines that the evaluation request does include version data processing proceeds to 418. At 418, evaluation server 122 compares the evaluation service version data generated at 408 with the request version data received in the request to determine if the request version data received in the evaluation request is more recent. This involves comparing the feature flag rule set version data received in the evaluation request with feature flag rule set version data generated at 408 and comparing the contextual data version data received in the evaluation request with the contextual data version identifier generated at 408.

Specifically, evaluation server 122 determines that the request version data is more recent if: any feature flag version identifier received in the evaluation request is a later-in-time version identifier than the corresponding feature flag version identifier accessed at 404; and/or the contextual data version identifier received in the evaluation request is a later-in-time version identifier than the contextual data version identifier retrieved at 406.

Where increasing integers are used as feature flag and contextual data version identifiers, this determination becomes: IF ((any received feature flag version identifier>corresponding feature flag version identifier accessed at 404) OR (received contextual data version identifier>contextual data version identifier retrieved at 406)) THEN the version data is more recent. Otherwise the version data is not more recent.

If, at 418, evaluation server 122 determines that the request version data is more recent than the evaluation service version data, processing continues to 420. At 420, evaluation server 122 generates an inconsistent version data response. As described above, one example of such a response is as follows:

```
{
   Error,
   Message: Inconsistent version data
}
```

The inconsistent version data response is generated because the front end client 112 has previously requested evaluation of a feature flag based on either later rule set version data and/or a later contextual data version than is currently available to the evaluation server 122 (via the service data store 124). As discussed above, this may occur due to the front end client 112 having had the feature flag previously evaluated by a different feature flag service (e.g. 120B) with more recent rule set and/or contextual data stored in its service data store 124B, while the current request is being handled by feature flag service 120A which has not yet received the updated rule set and/or contextual data.

At 422, evaluation server 122 communicates the inconsistent version data response to the front end client 112. As described above (with reference to operation 320), the inconsistent version data response causes the client to adopt the more recent evaluation results for the feature flag (as stored locally by the front end client 112).

Returning to 418, if evaluation server 122 does not determine that the version data is more recent, processing continues to 412 (and then 408/414/416) as described above.

While the operations above have been described in respect of a front end client 112 encountering/requesting evaluation of a set of feature flags alternative implementations are possible. For example, a front end client 112 could encounter individual feature flags (each identified by a feature flag identifier) and request evaluation thereof (either separately or in a batch mode) by use of their feature flag identifiers rather than a set identifier.

To illustrate the consistency provided by the operations described above, consider the following scenario.

The service data store 124A of feature flag service 120A currently stores rule set version 1 for feature flag identifier "1" and contextual data version identifier "3" for user identifier "user-1234". This leads to a simplified version data as follows:

"flag 1:1;user-1234:3"

With this rule set and contextual data, evaluation sever 122 evaluates feature flag 1 for user-1234 as true.

At the same time, the service data store 124B of feature flag service 120B currently stores rule set version 1 for feature flag identifier "1" and contextual data version identifier "2" for user identifier "user-1234". This leads to version data as follows (simplified for the purposes of the present example):

"flag1:1;user-1234:2"

With this rule set and contextual data, evaluation sever 122 evaluates feature flag 1 for user-1234 as false.

Consider also a front end client 112 that initially connects to feature flag service 120A to request evaluation of feature flag identifier "1" for user identifier "user-1234" and, following this, connects to feature flag service 120B to request evaluation of feature flag identifier "1" for user identifier "user-1234".

Under normal operation (i.e. not in accordance with the operations described above), when front end client 112 initially requests evaluation the request is received by feature flag service 120A and client 112 therefore receives an evaluation response indicating that the feature of feature flag "1" should be enabled. As a result the feature will be provided to the user. When front end client 112 subsequently requests evaluation the request is directed to feature flag service 120B and client 112 therefore receives an evaluation response indicating that the feature of feature flag "1" should not be enabled (and the feature will not be provided/disappear).

When the operations of FIGS. 3 and 4 are taken into account, however, a different result is achieved.

When front end client 112 initially requests evaluation (e.g. per 310) the request is received by evaluation server 122A of feature flag service 120A (at 406). Feature flag service 120A generates (at 414) and communicates (at 402) an evaluation results response. The evaluation results response includes the evaluation result indicating that the feature of feature flag "1" should be enabled as well as the version data "flag 1:1;user-1234:3". The front end client 112 receives the evaluation results response (at 312) and stores (at 316) both the evaluation result for the feature flag and the version data in the user device data store 114. The front end client 112 then and enables the feature of feature flag "1".

When front end client 112 subsequently requests evaluation the evaluation requests (generated at 308) includes the version data "flag1:1;user-1234:3". In this case the evaluation request is routed to/received by feature flag server 122B of feature flag service 120B. Evaluation server 122B then compares the version data received in the request ("flag1:1;user-1234:3") with data that stored in the service data store 124B. This comparison shows that: the received feature flag version identifier ("1") is the same as the feature flag version identifier stored in the service data store (which is also "1"); and the received contextual data version identifier ("3") indicates a later version of contextual data than is indicated by the contextual data version identifier stored in the service data store (which is "2"). As a result, evaluation server 122B generates an inconsistent version data response (at 420) and communicates this to the front end client 112 (at 422). The front end client 112 receives the inconsistent version data response (at 312), determines that the feature of feature flag "1" should be enabled (based on the most recent evaluation result for the feature flag, as stored in user device data store 114), and enables the feature of feature flag "1" (at 320). Thus the front end client has enabled the feature in question even though the evaluation result that would have been returned by feature flag server 122B would have been false.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method comprising:
   executing an application defining a feature flag, the execution of the application being associated with a user identifier;
   determining if version data associated with the feature flag and the user identifier is stored in a local data store;
   in response to determining that the version data associated with the feature flag and the user identifier is stored in the local data store:
   generating an evaluation request that includes the version data and the user identifier; and
   communicating the evaluation request to a feature flag evaluation service;
   receiving an evaluation response from the feature flag evaluation service;
   in accordance with a determination that the evaluation response indicates that the version data is inconsistent with reference version data associated with the feature flag and the user identifier and stored in association with the feature flag evaluation service:
   retrieving a locally stored evaluation result in respect of the feature flag from the local data store; and
   enabling or disabling a feature defined by the feature flag based on the locally stored evaluation result.

2. The computer implemented method of claim 1, further comprising:
   in accordance with a determination that the evaluation response includes a new evaluation result in respect of the feature flag:
   retrieving the new evaluation result from the evaluation response; and
   enabling or disabling the feature defined by the feature flag based on the new evaluation result.

3. The computer implemented method of claim 2, further comprising:
   storing the new evaluation result in respect of the feature flag in the local data store.

4. The computer implemented method of claim 2, further comprising:
   retrieving new version data from the evaluation response; and
   storing the new version data in the local data store, the new version data being associated with the feature flag and the user identifier.

5. The computer implemented method of claim 4, further comprising:
   re-executing the application defining the feature flag, the re-execution of the application being associated with the user identifier;
   generating a further evaluation request that includes the new version data and the user identifier; and
   communicating the further evaluation request to the feature flag evaluation service.

6. The computer implemented method of claim 1, wherein the version data comprises:
   rule set version data which identifies a version of a rule set associated with the feature flag; and
   contextual data version data which identifies a version of contextual data associated with the user identifier.

7. The computer implemented method of claim 1, wherein:
   the version data indicates a recency of the version data stored in the local data store; and
   the evaluation request further includes an identifier of the feature flag.

8. A computer implemented method comprising:
   receiving an evaluation request from a client, the evaluation request including a user identifier, feature flag data in respect of a feature flag, and request version data;
   generating evaluation service version data based on the user identifier and the feature flag data;
   determining if the request version data is more recent than the evaluation service version data; and
   in response to determining that the request version data is more recent than the evaluation service version data:

generating an inconsistent version data type evaluation response that does not include an evaluation result in respect of the feature flag; and communicating the inconsistent version data type evaluation response to the client, wherein the client is configured to, in response to receipt of the inconsistent version data type evaluation:

retrieve a locally stored evaluation result from a local data store; and enable or disable a feature defined by the feature flag based on the locally stored evaluation result.

9. The computer implemented method of claim 8, wherein in response to determining that the request version data is not more recent than the evaluation service version data the method further comprises:

determining an evaluation result in respect of the feature flag;

generating an evaluation results type evaluation response, the evaluation results type evaluation response including the evaluation result; and communicating the evaluation results type evaluation response to the client.

10. The computer implemented method of claim 9, wherein the evaluation results type evaluation response includes the evaluation service version data.

11. The computer implemented method of claim 8, wherein:

the request version data and the evaluation service version data each include rule set version data which identifies a version of a rule set associated with the feature flag and contextual data version data which identifies a version of contextual data associated with the user identifier; and in accordance with the version of the rule set identified in the request version data being more recent than the version of the rule set identified in the evaluation service version data, the request version data is determined to be more recent than the evaluation service version data.

12. The computer implemented method of claim 11, wherein:

in accordance with the version of the contextual data identified in the request version data being more recent than the version of the contextual data identified in the evaluation service version data, the request version data is determined to be more recent than the evaluation service version data.

13. A computer processing system comprising:

a processing unit;

a communications interface; and a non-transitory computer-readable storage medium storing instructions, which when executed by the processing unit, cause the processing unit to perform a method comprising:

executing an application defining a feature flag, the execution of the application being associated with a user identifier;

determining if version data associated with the feature flag and the user identifier is stored in a local data store;

in response to determining that the version data associated with the feature flag and the user identifier is stored in the local data store:

generating an evaluation request that includes the version data and the user identifier; and communicating, via the communications interface, the evaluation request to a feature flag evaluation service receiving, via the communications interface an evaluation response from the feature flag evaluation service;

in accordance with a determination that the evaluation response indicates that the version data is inconsistent with reference version data associated with the feature flag and the user identifier and stored in association with the feature flag evaluation service:

retrieving a locally stored evaluation result from the local data store; and enabling or disabling a feature defined by the feature flag based on the locally stored evaluation result.

14. The computer processing system of claim 13, wherein the method further comprises:

in accordance with a determination that the evaluation response includes a new evaluation result in respect of the feature flag:

retrieving the new evaluation result from the evaluation response; and enabling or disabling the feature defined by the feature flag based on the new evaluation result.

15. The computer processing system of claim 14, wherein the method further comprises:

storing the new evaluation result in respect of the feature flag in the local data store.

16. The computer processing system of claim 14, wherein the method further comprises:

retrieving new version data from the evaluation response; and storing the new version data in the local data store, the new version data being associated with the feature flag and the user identifier.

17. The computer processing system of claim 16, wherein the method further comprises:

re-executing the application defining the feature flag, the re-execution of the application being associated with the user identifier;

generating a further evaluation request that includes the new version data and the user identifier; and communicating the further evaluation request to the feature flag evaluation service.

18. The computer processing system of claim 13, wherein the version data comprises:

rule set version data which identifies a version of a rule set associated with the feature flag; and contextual data version data which identifies a version of contextual data associated with the user identifier.

19. The computer processing system of claim 18, wherein the version data indicates a recency of the version data stored in the local data store.

20. The computer processing system of claim 18, wherein the evaluation request further includes an identifier of the feature flag.

* * * * *